United States Patent [19]

Oehler

[11] 4,239,962
[45] Dec. 16, 1980

[54] SUNSHIELD AND LIGHT DIFFUSER

[76] Inventor: Kenneth L. Oehler, Box 840, 501 Noton St., Pflugerville, Tex. 78660

[21] Appl. No.: 950,686

[22] Filed: Oct. 12, 1978

[51] Int. Cl.³ .............................................. G06M 7/00
[52] U.S. Cl. ............................ 250/222 R; 250/237 R
[58] Field of Search ............... 324/175, 178; 250/221, 250/222 R, 237 R

[56] References Cited

U.S. PATENT DOCUMENTS

| 2,294,730 | 9/1942 | Eggers | 324/178 |
| 2,442,690 | 6/1948 | Hoffman et al. | 324/178 |
| 3,025,406 | 3/1962 | Stewart et al. | 250/222 |

Primary Examiner—David C. Nelms
Attorney, Agent, or Firm—Roylance, Abrams, Berdo & Farley

[57] ABSTRACT

In a ballistic velocity measuring device, two photodetectors are spaced apart by an accurately known distance along a projectile path exposed to ambient light from the sky. The invention comprises a sunshield and light diffuser structure for each (or both) of the photodetectors to eliminate light reflection from the projectile which can cancel the "shadow" of the projectile and prevent the photodetector from responding to passage of the projectile; and to increase the level of light to the photodetectors by diffusing direct sunlight.

6 Claims, 6 Drawing Figures

U.S. Patent   Dec. 16, 1980   Sheet 1 of 2   4,239,962
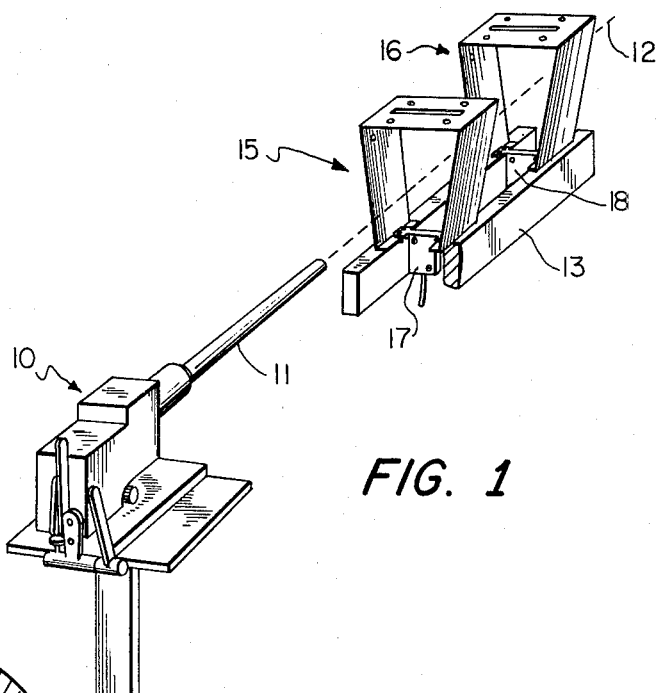
FIG. 1
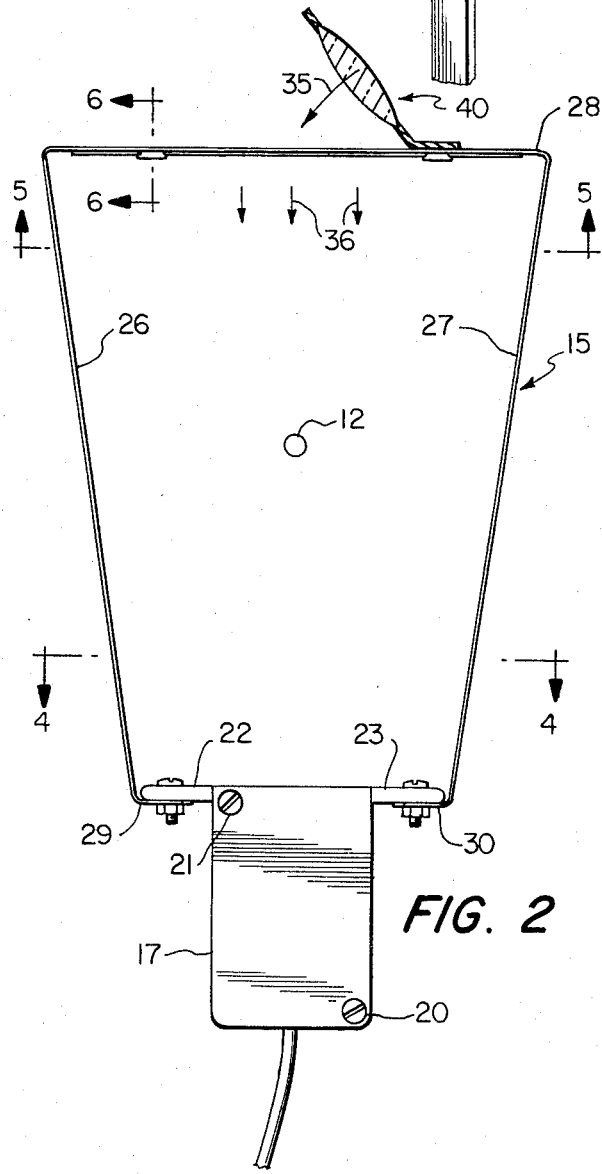
FIG. 2
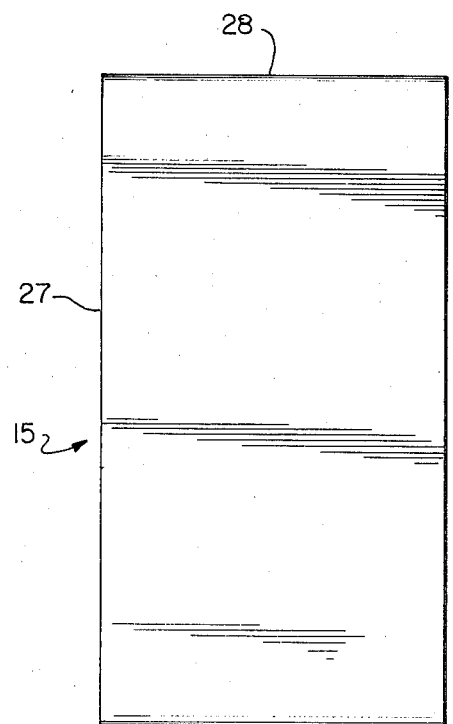
FIG. 3
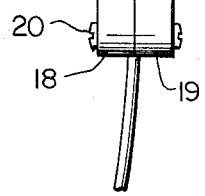

4,239,962

SUNSHIELD AND LIGHT DIFFUSER

This invention relates to an improved sunshield and light diffuser for use in an apparatus for measuring ballistic projectile trajectory.

BACKGROUND OF THE INVENTION

In the measurement of ballistic projectile velocity, it is common to use a pair of photodetectors spaced a known distance apart to signal to a timer that the projectile has passed each detector. The interval of time measured by the timer and the known distance are then used to compute an instrumental velocity. The photodetectors normally operate by having the receiving elements (typically photodiodes or phototransistors) placed so that they receive steady illumination from incandescent lamps or another steady light source such as the sky or other broad source of light. The receiving element, the light source and the expected projectile path are arranged so that the projectile passes between the light source and the receiving element. The passage of the projectile causes a momentary decrease in the light intensity received by each receiving element. The electrical response of each receiving element is amplified and processed to provide appropriate start and stop signals to the timer.

The photodetector assemblies are typically called "screens" in the ballistics field because they replace physical conducting grids or screens which were used in earlier devices to signal passage of a projectile. Screens utilizing incandescent light sources were typically called "Lumiline" screens because the lamp most commonly used was a Lumiline lamp manufactured by the General Electric Company and others. Screens utilizing ambient light from the sky viewed through an optical slit or other mask were commonly called "sky screens". At the present time, the screens represent the most critical part of a velocity measuring system. The present state of the art in counting and computation circuits required for the timing and time-to-velocity conversion are far ahead of the technology of the screens.

U.S. patent application Ser. No. 840,254, filed Oct. 7, 1977, now U.S. Pat. No. 4,128,761, by the present inventor is directed to a system for dealing with a typical problem encountered in the fabrication and operation of photodetector assemblies for ballistics use arising because the illumination received by the receiving element is not constant because of varying voltage to the incandescent lamp or lamps, varying amounts of dust in the light transmission path between the light source and the receiving element, aging of the incandescent lamp, varying distances from the light source to the receiving element, and varying cloud and atmospheric conditions and sun angles in the case of sky screens. Reference is made to application Ser. No. 840,254 for a discussion of the electronic aspects of the system which will not be discussed herein, and that application is hereby incorporated by reference.

When using sky screens, the photosensitive elements (normally two in number) view a segment of unobstructed sky through an optical slit. As the projectile passes into the field of view of each photosensitive element, a portion of the light incident thereon is momentarily obstructed, causing a change in the electrical characteristics of each element in sequence. The changes result in electrical signals which are suitably amplified and used to start and stop a timing circuit.

In prior devices of this general type, two significant problems are encountered. The first problem is that, contrary to what might be expected, the light available from a clear sky is significantly less than that available from a cloudy or hazy sky. The reason for this is that the available light for sky screen operation is the diffused light from atmospheric particles and is not the direct light from the sun. While amplifiers preceding the timing circuits can compensate for the reduced light level, at least in part, the system will work better with more light and if the available apparent light level is increased, the range of operation of the system is also increased.

The second problem is that direct light from the sun sometimes reflects from that portion of the projectile, e.g., a bullet, which generally faces the photodetector. This reflected light can be less than, approximately equal to, or greater than the amount of diffused light blocked by the bullet. If the reflected light is either significantly greater than or significantly less than the amount of diffused light blocked by the bullet, circuits such as that disclosed in previously mentioned application Ser. No. 840,254 will respond because such a circuit is designed to detect any perturbation in light level about the ambient level, regardless of the direction of that perturbation. However, in the case in which the reflected light is approximately equal to the amount of diffused light which reaches the photosensitive element in the absence of a projectile, the photosensitive element sees no significant change in the light level when the bullet passes. In other words, the shadow which would be expected to fall on the photosensitive element is essentially obliterated by that reflected light. Because the cancellation of "light with shadow" occurs prior to the point in the system where light levels are converted to electrical signals, there is no way to recover the lost information by using electrical signal processing techniques.

BRIEF DESCRIPTION OF THE INVENTION

Accordingly, it is an object of the present invention to provide a photocell shielding structure which overcomes the aforementioned problems and improves the operating characteristics of a ballistic projectile velocity measuring apparatus.

A further object is to provide a sky screen structure in which the photosensitive elements are shielded from direct impinging light and in which a diffuser means is supplied to improve the characteristics of source light for the photosensitive elements.

Briefly described, the invention includes an apparatus for use in combination with a ballistic characteristic measuring system of the type having first and second photosensitive elements, means for mounting the elements along the path of a projectile in an environment exposed to daylight with the light responsive portions of the elements directed toward segments of the path so that each of the photosensitive elements responds to changes in light incident thereon to produce a signal evidencing the passage of a projectile, and circuit means connected to the photosensitive elements for measuring the time interval between changes in the light level, the apparatus comprising at least one generally U-shaped light shield means for preventing direct sunlight illumination of the projectile path segments toward which the light sensitive portions of the photosensitive elements are directed, and means for mounting said at least one light shield means in a position to generally surround the path segments between the source and the light sensitive portions.

In this context, the term "projectile" will be understood to include either a single body or a cluster of bodies such as a group of shot.

The invention further contemplates means carried by the light shield means for diffusing the ambient daylight and directing the diffused light across the path segments toward said light sensitive portions.

In order that the manner in which the foregoing and other objects are attained in accordance with the invention can be understood in detail, a particularly advantageous embodiment thereof will be described with reference to the accompanying drawings, which form a part of this specification, and wherein:

FIG. 1 is a schematic perspective view of a ballistic measuring apparatus incorporating the apparatus of the present invention;

FIG. 2 is a front elevation of a shield and diffuser apparatus in accordance with the present invention;

FIG. 3 is a side elevation of the structure of FIG. 1;

Figure 4:
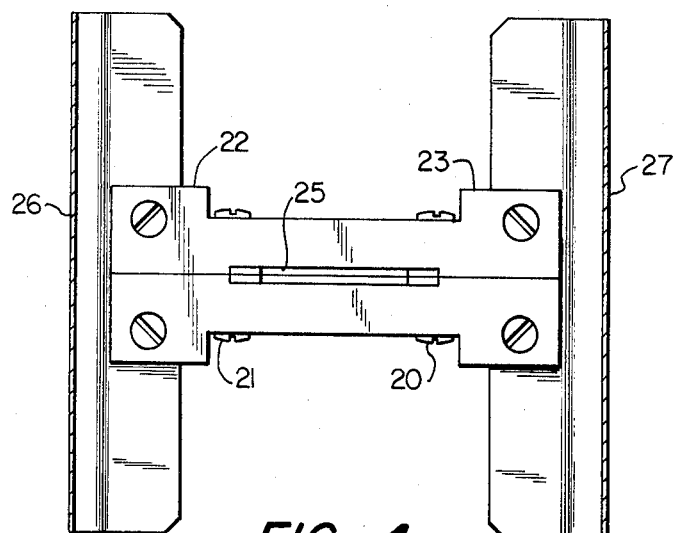
FIG. 4 is a plan view, in section, along line 4—4 of FIG. 2.

FIG. 1 shows the general arrangement for a firearm and apparatus for determining the velocity of a projectile emerging from that firearm. As shown in FIG. 1, the firearm is schematically illustrated at 10 with the barrel 11 thereof oriented so as to fire a projectile along an axis 12 through the measuring apparatus. This measuring apparatus includes a supporting device such as a table or framework 13 which supports two photocell and shield structures indicated generally at 15 and 16 defining generally trapezoidal openings through which the projectile will pass. The structures include photocell units 17 and 18 which are mounted on the supporting structure in spaced apart relationship along axis 12 by a known and accurately determined distance. The distance is combinable with a measure of the time interval taken by the projectile in passing from one photocell to the next for the purpose of determining the projectile average velocity over that interval. Structures 15 and 16 are identical and only structure 15 will be described in detail hereinafter.

Structures 15 and 16 are, as will be recognized from the preceding discussion, devices of the type referred to as sky screens, and the portions thereof facing upwardly will be assumed to be directed generally toward the sun. While it is by no means necessary that these surfaces face directly toward the sun, they should be oriented generally in that direction. Normally, if these surfaces face upwardly in moderate latitudes, the light thus obtained is adequate except when the sun is very close to the horizon. However, under conditions of extremely clear skies, orientation of these surfaces more in the direction from which sunlight emanates may be necessary. For this purpose, the supporting structure 13 can be made so that the angle thereof can be changed, permitting structures 15 and 16 to be rotated generally about axis 12. No effort has been made to illustrate an adjustable supporting structure in FIG. 1, such structures being conventional in other contexts.

Referring now to FIGS. 2-6, it will be seen that the photocell unit 17 includes a housing of a generally rectangular shape, the housing being conveniently formed using two substantially identical half shells 18 and 19, held together by threaded fasteners 20 and 21. At the upper end thereof, the housing includes laterally extending mounting tabs 22 and 23 which constitute extensions of the upper surface thereof. As best seen in FIG. 4, each half of the housing is provided with a shallow rectangular recess at the upper surface so that when the halves are joined, these recesses define a slot 25 permitting light to enter the housing. In a well-recognized manner, a photoresponsive device can be mounted with its light responsive surface behind this slot so that light is received in a relatively narrow field of view. Tabs 22 and 23 are provided with openings so that they can be attached to the shield structure.

The shield structure itself includes side walls 26 and 27 which extend generally upwardly and, in the embodiment shown, also outwardly from the photocell structure. At the upper end thereof, walls 26 and 27 are connected to an end wall 28 which forms the "roof" of the shield structure. Inwardly extending short wall portions 29 and 30 at the bottom of walls 26 and 27 define means for attachment to tabs 22 and 23. The walls of the shield structure can be formed using sheet metal or plastic, the requirements thereof being only that the walls are substantially opaque and that the inner surfaces of walls 26 and 27 be coated or otherwise finished so that they have low light reflectance characteristics. It is, for example, appropriate to paint the inner surfaces of these walls with a flat black finish.

It will be observed that walls 26, 27 and 28 form a generally U-shaped light shield means for preventing direct sunlight illumination of that segment of the projectile path, indicated in FIG. 2 by the circle 12 toward which the light sensitive portion of the photosensitive element in the photocell unit 17 is directed, the light shield means being mounted to tabs 22 and 23 so that it generally surrounds the path segment between the light sensitive portion and the source of sunlight.

Figure 5:
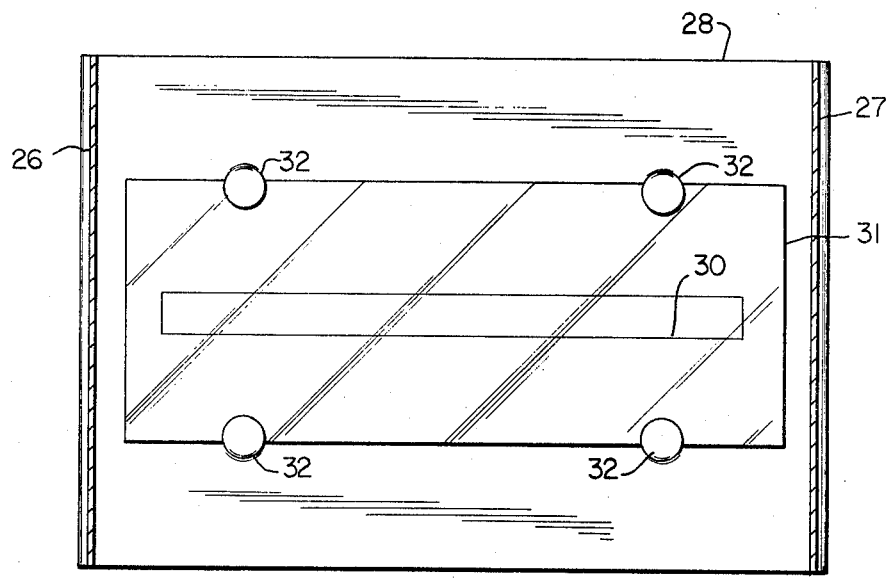
FIG. 5 is a bottom plan view, in section, along line 5—5 of FIG. 2.
Figure 6:
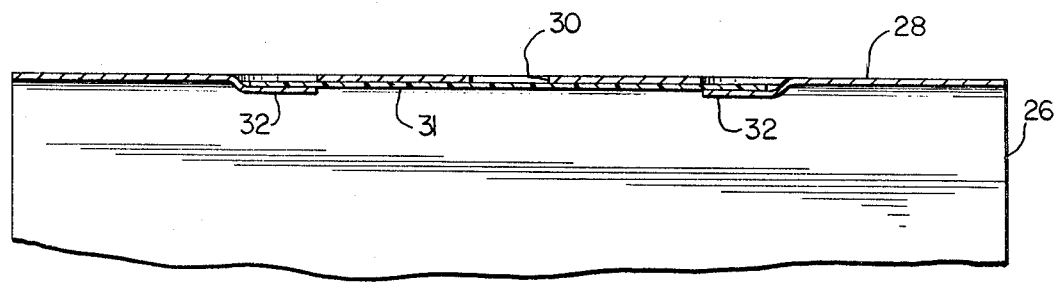
FIG. 6 is a partial side elevation, in section, along line 6—6 of FIG. 2.

As best seen in FIGS. 5 and 6, end wall 28 is provided with means defining a slot 30 through which light can pass. The structure also includes means carried by the light shield means for diffusing ambient daylight and directing the diffused light across the path segment toward the light sensitive portion, this means including a sheet 31 of material such as frosted glass, frosted plastic, thin white translucent cloth, or even paper. The nature of the material is not particularly important, so long as it presents a "frosted" appearance, or translucent appearance, but not transparent, thereby permitting it to perform the function of diffusing the light passing through slot 30. Wall 28 is provided with means for attaching sheet 31 to the inner surface of wall 28, the means illustrated being partially punched-out circular portions 32 which extend inwardly beyond the inner surface of wall 28, lying substantially parallel thereto and spaced therefrom to leave a small gap capable of receiving sheet 31 in reasonably tight relationship. The open sides of the punched out portions face each other so that the material of sheet 31, if flexible, can be bent and inserted into the punched-out portions. If glass or a similar non-flexible material is used, it will obviously be necessary to provide some different form of attachment, such as a spring clip or the like, capable of being moved to receive the translucent sheet.

As will be recognized, it is desirable to orient the apparatus shown in FIG. 1 so that fairly direct light reaches slot 30, somewhat as indicated by arrow 35 in FIG. 2, thereby permitting light diffused by sheet 31 to enter the volume defined by the light shield means, as indicated by arrows 36. The projectile passing along path 12 passes between the diffusing element and the photosensitive element so that the photosensitive element will see the projectile silhouetted against the source of diffused light. Placing this diffuser or "artificial cloud" above the path of the projectile significantly increases the amount of background light available and thus aids in proper operation of the system under the conditions of very clear skies or when the sun is near the horizon giving little diffused light from the overhead sky.

As a further embodiment of the apparatus to increase the light available to the projectile path and the photocells, a light collecting optical device 40 can be placed in the position occupied by arrow 35 in FIG. 2., with its axis directed toward the sun and toward slot 30. The optical device can be a simple lens, as illustrated in FIG. 2, or if necessary can be a somewhat more complex compound system with multiple lenses. Alternatively, a reflector can be mounted on the shield to enhance collection of light, the reflector being suitably mounted to direct reflected light toward slot 30.

It will further be recognized that a light shield could be used which is formed entirely of light diffusing material. However, this would not assure solving the problem of reflected light from the bottom half of the projectile, i.e., that portion of the projectile which is directed generally toward the photosensitive element behind slot 25. Thus, it is highly advantageous to make the remainder of the sunshield of an opaque structure, the sides thereof being substantially vertically extending along both sides of the projectile path between that path and the source of direct light.

The shield can be fastened to the photosensitive detector element in various fashions. In the example shown, machine screws and nuts are used to interconnect the shield to tabs 22 and 23, but it is desirable to mount the shield in such a fashion that it can be rather easily removed. Thus, the openings passing through portions 29 and 39 can be formed as U-shaped slots extending inwardly from the distal edges of those portions of the shield, rather than holes, so that when the threaded fasteners are loosened, the shield sides can be bent outwardly away from each other, removing the device from the photodetector. Obviously, this requires that the photodetector itself, rather than the shield, be mounted to support structure 13. Removal of the shield is, of course, desirable when the apparatus is being used under conditions of a cloudy sky when diffused light is available from above and direct light from the side does not present a significant likelihood of reflection from the bottom of the projectile.

As previously indicated, the terms "above" and "below" are with reference to the apparatus oriented as illustrated in FIG. 1, but that the entire structure can be tilted to one side or the other depending upon the relationship thereof to direct light sources.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus for use in combination with a ballistic characteristic measuring system of the type having first and second photosensitive elements, means for mounting the elements along the path of a projectile in an environment exposed to daylight with the light responsive portions of the elements directed toward segments of the path so that each of the photosensitive elements responds to changes in light incident thereon to produce a signal evidencing the passage of a projectile, and circuit means connected to the photosensitive elements for measuring the time interval between changes in the light level, the apparatus comprising at least one generally U-shaped light shield means for preventing direct sunlight illumination of the projectile path segments toward which the light sensitive portions of the photosensitive elements are directed; and means for mounting said at least one light shield means in a position to generally surround said path segments between the source and said light sensitive portions.

2. An apparatus according to claim 1 and further comprising means carried by said light shield means for diffusing the ambient daylight and directing the diffused light across said path segments toward said light sensitive portions.

3. An apparatus according to claim 2 wherein said means for mounting includes a housing for containing each of said first and second photosensitive elements, each said housing being opaque and having means defining a window to admit light to the light sensitive portion of the element contained therein;

and wherein said light shield means includes an end wall and first and second substantially opaque side walls extending between said end wall and said housing, said side walls being releasably attached to said housing on opposite sides of said window.

4. An apparatus according to claim 3 wherein said means for diffusing includes means defining an opening in said end wall, and a panel of light diffusing material extending across said opening and attached to said end wall.

5. An apparatus according to claim 2 and further comprising means for collecting light and directing the collected light toward said means for diffusing.

6. An apparatus according to claim 5 wherein said means for collecting is a lens.

* * * * *